US012536069B2

(12) United States Patent
Li

(10) Patent No.: US 12,536,069 B2
(45) Date of Patent: Jan. 27, 2026

(54) METHOD AND NON-TRANSITORY COMPUTER-READABLE STORAGE MEDIUM AND APPARATUS FOR READ RETRY

(71) Applicant: Silicon Motion, Inc., Zhubei (TW)

(72) Inventor: Fa-Hao Li, Shenzhen (CN)

(73) Assignee: SILICON MOTION, INC., Zhubei (TW)

(*) Notice: Subject to any disclaimer, the term of this patent is extended or adjusted under 35 U.S.C. 154(b) by 47 days.

(21) Appl. No.: 18/748,426

(22) Filed: Jun. 20, 2024

(65) Prior Publication Data

US 2025/0238316 A1    Jul. 24, 2025

(30) Foreign Application Priority Data

Jan. 22, 2024  (CN) .......................... 202410089854.5

(51) Int. Cl.
*G06F 11/10* (2006.01)
(52) U.S. Cl.
CPC ...... *G06F 11/1068* (2013.01); *G06F 11/1004* (2013.01); *G06F 11/1016* (2013.01)
(58) Field of Classification Search
CPC ............ G06F 11/1004; G06F 11/1016; G06F 11/1068; G06F 3/0619; G06F 3/0673; G06F 3/0679
See application file for complete search history.

(56) References Cited

U.S. PATENT DOCUMENTS

| | | | |
|---|---|---|---|
| 2014/0101519 A1* | 4/2014 | Lee .................. | G11C 16/26 714/773 |
| 2015/0162057 A1* | 6/2015 | Alhussien ............... | G11C 7/14 365/189.11 |
| 2020/0402580 A1 | 12/2020 | Kim et al. | |
| 2021/0027845 A1* | 1/2021 | Lu .......................... | G06F 3/0679 |
| 2021/0043261 A1 | 2/2021 | Yu et al. | |
| 2021/0132931 A1 | 5/2021 | Cariello | |
| 2022/0093182 A1* | 3/2022 | Kuribara ............... | G06F 3/0619 |
| 2022/0179724 A1 | 6/2022 | Shim et al. | |
| 2022/0197741 A1 | 6/2022 | Pitchumani et al. | |

FOREIGN PATENT DOCUMENTS

| | | |
|---|---|---|
| CN | 112099730 A | 12/2020 |
| CN | 112349324 A | 2/2021 |
| CN | 113903388 A | 1/2022 |
| CN | 114610522 A | 6/2022 |
| CN | 114661516 A | 6/2022 |

* cited by examiner

*Primary Examiner* — Shelly A Chase
(74) *Attorney, Agent, or Firm* — Birch, Stewart, Kolasch & Birch, LLP

(57) ABSTRACT

The invention introduces a method for read retry, performed by a processing unit, includes: providing a first set of re-read voltages in an iteration of a read retry mechanism; obtaining a second set of re-read voltages with a maximum distance from the first set of re-read voltages; driving a flash interface (I/F) to use the second set of re-read voltages to read a designated page and obtain second data from a flash module; and in response that the second data is correct, or the second data is successfully corrected by an error correction unit, exiting the read retry mechanism and replying with the second data or corrected second data to a host side or storing the second data or the corrected second data at a designated address of a random access memory (RAM).

20 Claims, 8 Drawing Sheets

METHOD AND NON-TRANSITORY COMPUTER-READABLE STORAGE MEDIUM AND APPARATUS FOR READ RETRY

CROSS-REFERENCE TO RELATED APPLICATIONS

This application claims the benefit of priority to patent application No. 202410089854.5, filed in China on Jan. 22, 2024; the entirety of which is incorporated herein by reference for all purposes.

BACKGROUND

The disclosure generally relates to storage devices and, more particularly, to a method, a non-transitory computer-readable storage medium and an apparatus for read retry.

Flash memory devices typically include NOR flash devices and NAND flash devices. NOR flash devices are random access—a host side accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host side has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word.

With increased programming/erasing cycles, the variant of ambient temperature, and increased number of storage times, the stability of the data stored in the flash module becomes worse, and in the worst case, a read error would occur. A read retry mechanism is triggered in response to the read error. Thus, it is desirable to have a computer-readable storage medium, a method, and an apparatus for read retry to improve the read performance.

SUMMARY

In an aspect of the invention, an embodiment introduces a method for read retry, performed by a processing unit of a flash controller, to include the following steps: providing a first set of re-read voltages in an iteration of a read retry mechanism, where the first set of re-read voltages are used in a previous iteration of a read retry mechanism or before the read retry mechanism is entered, and the processing unit has driven a flash interface (I/F) to use the first set of re-read voltages to read a designated page and obtain first data from the flash module; obtaining a second set of re-read voltages with a maximum distance from the first set of re-read voltages, where the second set of re-read voltages are obtained from unprocessed sets of re-read voltages in a re-read voltage difference table; driving the flash I/F to use the second set of re-read voltages to read the designated page and obtain second data from the flash module; and in response that the second data is correct, or the second data is successfully corrected by an error correction unit, exiting the read retry mechanism and replying with the second data or corrected second data to a host side or storing the second data or the corrected second data at a designated address of a random access memory (RAM).

In another aspect of the invention, an embodiment introduces a non-transitory computer-readable storage medium having stored therein program code that, when loaded and executed by a processing unit of a flash controller, causes the processing unit to perform the method for read retry as described above.

In still another aspect of the invention, an embodiment introduces an apparatus for read retry, to include: a flash I/F, coupled to a flash module; and a processing unit, coupled to the flash I/F. The processing unit is arranged operably to: provide a first set of re-read voltages in an iteration of a read retry mechanism, where the first set of re-read voltages are used in a previous iteration of a read retry mechanism or before the read retry mechanism is entered, and the processing unit has driven the flash I/F to use the first set of re-read voltages to read a designated page and obtain first data from the flash module; obtain a second set of re-read voltages with a maximum distance from the first set of re-read voltages, where the second set of re-read voltages are obtained from unprocessed sets of re-read voltages of a re-read voltage difference table; drive the flash I/F to use the second set of re-read voltages to read the designated page and obtain second data from the flash module; and in response that the second data is correct, or the second data is successfully corrected by an error correction unit, exit the read retry mechanism and reply with the second data or corrected second data to a host side or store the second data or the corrected second data at a designated address of a RAM.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Certain aspects and embodiments of this disclosure are provided below. Some of these embodiments may be applied independently and some of them may be applied in conjunction as would be apparent to those of skill in the art. In the following description, for the purposes of explanation, specific details are set forth in order to provide a thorough understanding of aspects of the application. However, it will be apparent that various embodiments may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that changes may be made in the function and arrangement of elements without departing from the spirit and scope of the application as set forth in the claims.

Figure 1:
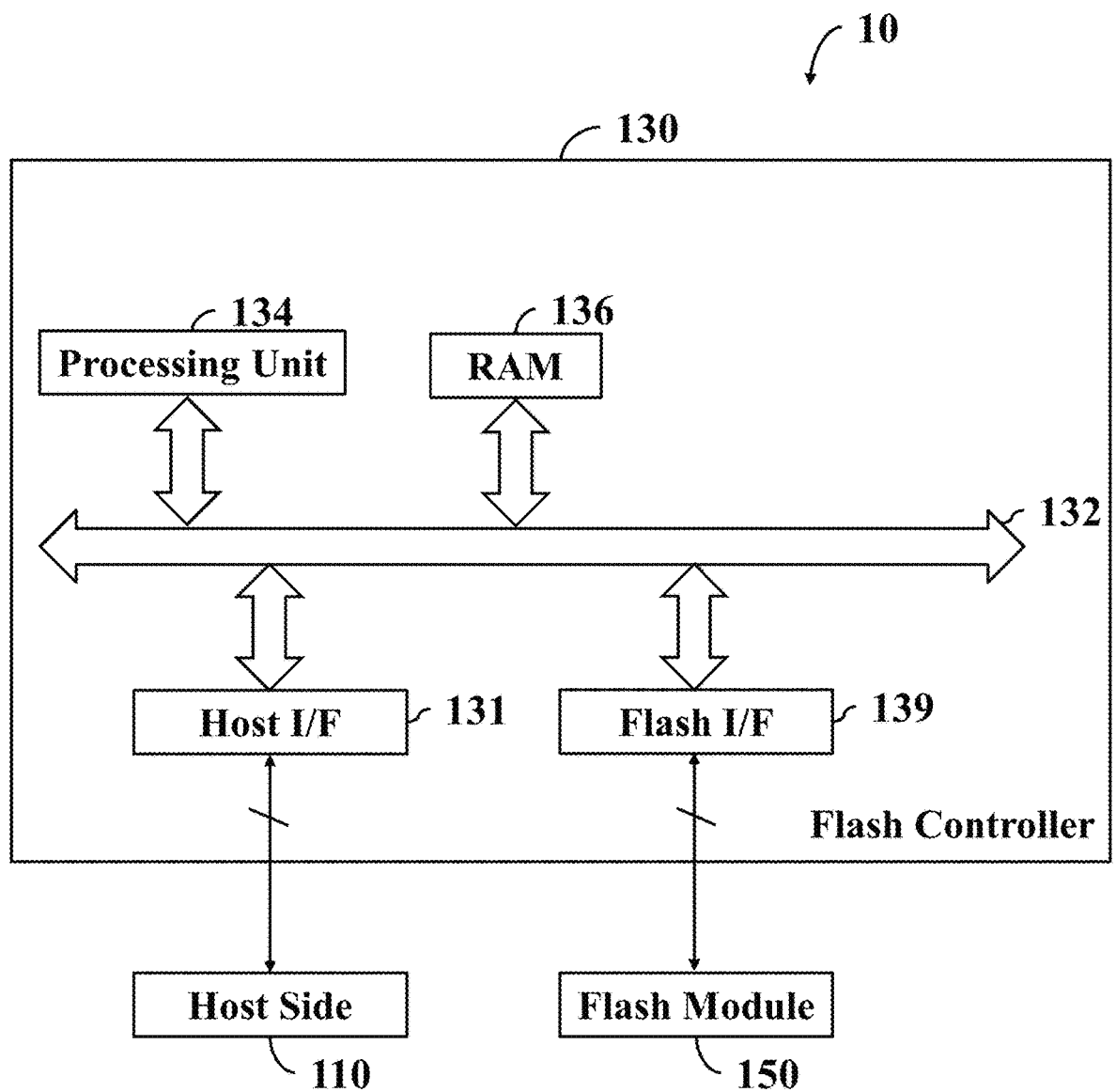
FIG. 1 is the system architecture of an electronic apparatus according to an embodiment of the invention.

Refer to FIG. 1. The electronic apparatus 100 includes the host side 110, the flash controller 130 and the flash module 150, and the flash controller 130 and the flash module 150 may be collectively referred to as a device side. The electronic apparatus 100 may be equipped with an external storage device, a Personal Computer (PC), a laptop PC, a tablet PC, a mobile phone, a digital camera, a digital recorder, a smart television, a smart freezer, an automotive electronics system or other consumer electronic products. The host side 110 and the host interface (I/F) 131 of the flash controller 130 may communicate with each other by Universal Serial Bus (USB), Advanced Technology Attachment (ATA), Serial Advanced Technology Attachment (SATA), Peripheral Component Interconnect Express (PCI-E), Universal Flash Storage (UFS), Embedded Multi-Media Card (eMMC) protocol, or others. The flash I/F 139 of the flash controller 130 and the flash module 150 may communicate with each other by a Double Data Rate (DDR) protocol, such as Open NAND Flash Interface (ONFI), DDR Toggle, or others. The flash controller 130 includes the processing unit 134 and the processing unit 134 may be implemented in numerous ways, such as with general-purpose hardware (e.g., a microcontroller unit, a single processor, multiple processors or graphics processing units capable of parallel computations, or others) that is programmed using firmware and/or software instructions to perform the functions recited herein. The processing unit 134 may receive host commands from the host side 110 through the host interface (I/F) 131, such as write commands, read commands, discard commands, erase commands, etc., schedule and execute the host commands. The flash controller 130 includes the Random Access Memory (RAM) 136, which may be implemented in a Dynamic Random Access Memory (DRAM), a Static Random Access Memory (SRAM), or the combination thereof, for allocating space as a data buffer storing user data (also referred to as host data) that has been obtained from the host side 110 and is to be programmed into the flash module 150, and that has been read from the flash module 150 and is to be output to the host side 110. The RAM 136 stores necessary data in execution, such as variables, data tables, data abstracts, Host-to-Flash mapping (H2F) tables, Flash-to-Host mapping (F2H) tables, queues, or others. The flash I/F 139 includes a NAND flash controller (NFC) to provide functions that are required to access to the flash module 150, such as a command sequencer, a Low Density Parity Check (LDPC) encoder/decoder, etc.

The flash controller 130 may be equipped with the bus architecture 132 to couple components to each other to transmit data, addresses, control signals, etc. The components include but not limited to the host I/F 131, the processing unit 134, the RAM 136 and the flash I/F 139. A direct memory access (DMA) circuitry of a component moves data between specific components through the bus architecture 132 according to instructions or control signals. For example, a DMA circuitry of the host I/F 131 or the flash I/F 139 may migrate data in a specific data buffer thereof to a specific address of the RAM 136, migrate data in a specific address of the RAM 136 to a specific data buffer thereof, and so on.

The flash module 150 provides huge storage space typically in hundred Gigabytes (GBs), or even several Terabytes (TBs), for storing a wide range of user data, such as high-resolution images, video files, etc. The flash module 150 includes control circuitries and memory arrays containing memory cells, such as being configured as Single Level Cells (SLCs), Multi-Level Cells (MLCs), Triple Level Cells (TLCs), Quad-Level Cells (QLCs), or any combinations thereof. The processing unit 134 programs user data into a designated address (a destination address) of the flash module 150 and reads user data from a designated address (a source address) thereof through the flash I/F 139. The flash I/F 139 may use several electronic signals including a data line, a clock signal line and control signal lines for coordinating the command, address and data transfer with the flash module 150. The data line may be used to transfer commands, addresses, read data and data to be programmed; and the control signal lines may be used to transfer control signals, such as Chip Enable (CE), Address Latch Enable (ALE), Command Latch Enable (CLE), Write Enable (WE), etc.

Figure 2:
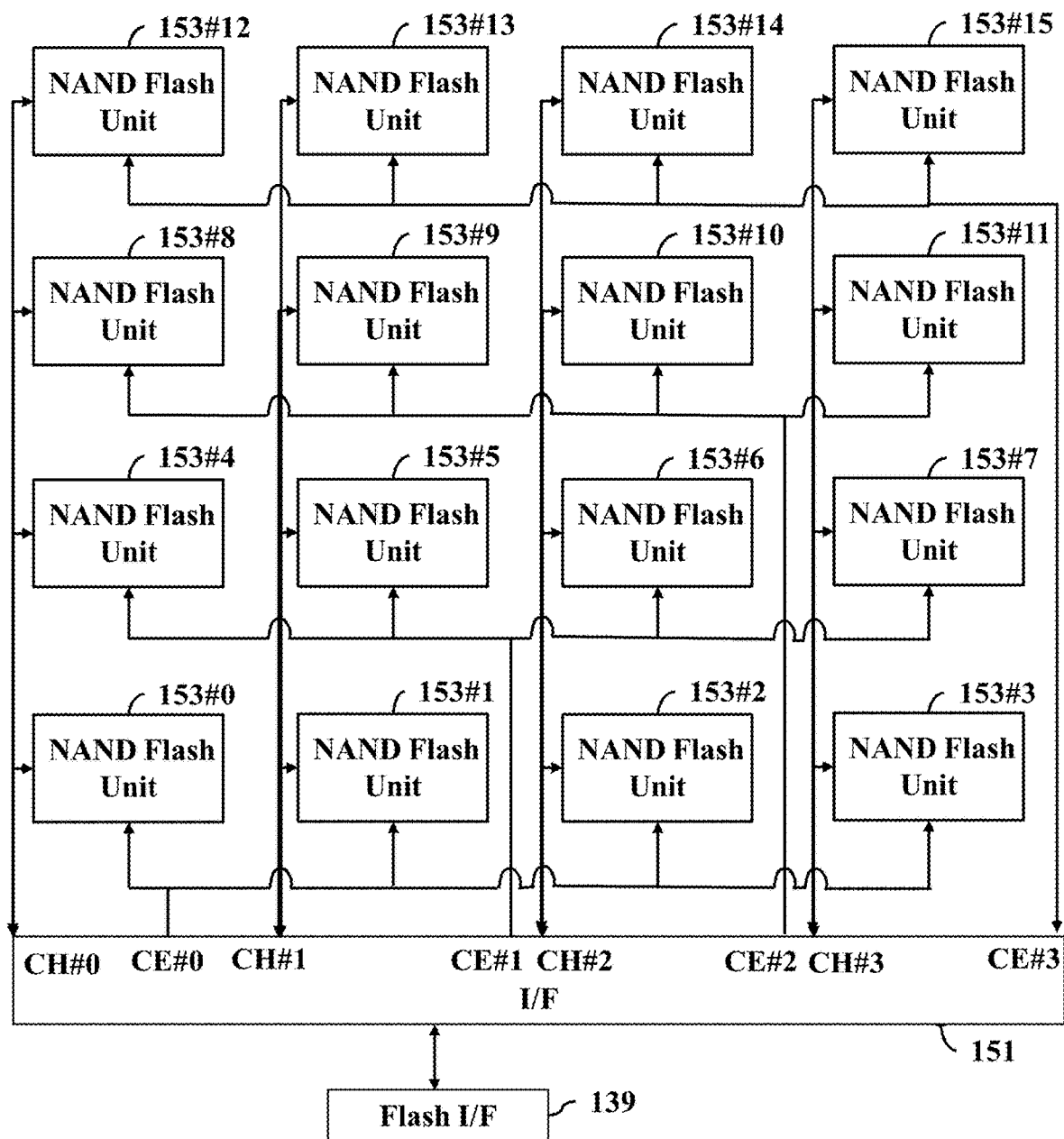
FIG. 2 is a schematic diagram illustrating a flash module according to an embodiment of the invention.

Refer to FIG. 2. The I/F 151 of the flash module 150 may include four I/O channels (hereinafter referred to as channels) CH #0 to CH #3 and each is connected to four NAND flash units, for example, the channel CH #0 is connected to the NAND flash units 150 #0, 150 #4, 150 #8 and 150 #12. Each NAND flash unit can be packaged in an independent die. The flash I/F 139 may issue one of the CE signals CE #0 to CE #3 through the I/F 151 to activate the NAND flash units 153 #0 to 153 #3, the NAND flash units 153 #4 to 153 #7, the NAND flash units 153 #8 to 153 #11, or the NAND flash units 153 #12 to 153 #15, and read data from or program data into the activated NAND flash units in parallel.

Figure 3:
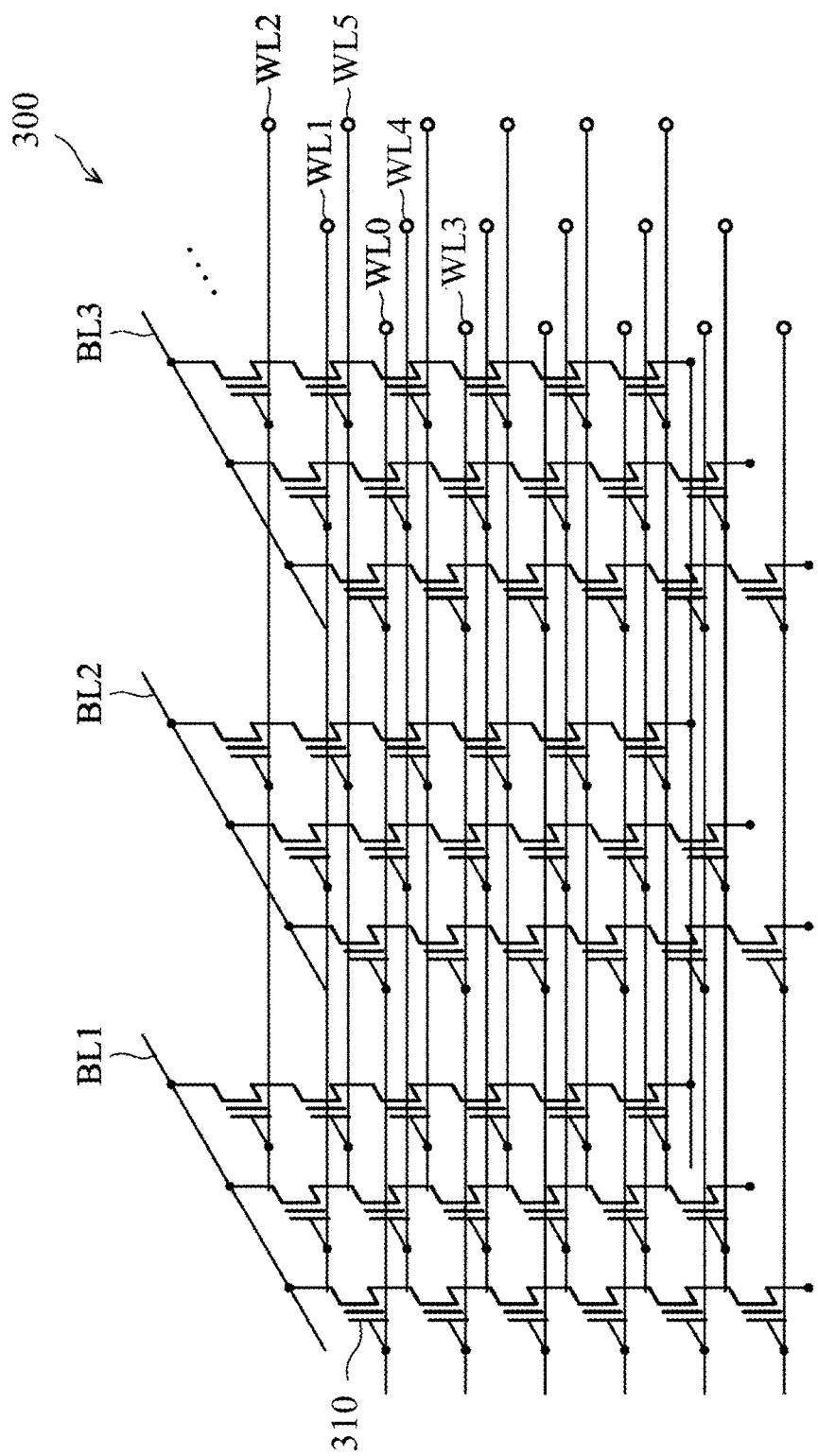
FIG. 3 is a schematic diagram showing the hardware architecture of a portion of a NAND flash unit according to an embodiment of the invention.

Refer to FIG. 3 showing the hardware architecture of a portion of a NAND flash unit. Each NAND flash unit may contain a plurality of memory blocks (e.g. the memory block 300) and the memory block 300 contains multiple memory cells, such as floating gate transistors (e.g. the floating gate transistor 310), or other charge trap devices. The structure of the memory block 300 includes bit lines and word lines. For brevity, only the bit lines BL1 to BL3 and the word lines WL0 to WL5 are labeled in FIG. 3. For example, the floating gate transistors on the word lines WL0 to WL2 and WL3 to WL5 form two pages for storing data of two pages, respectively.

When each memory cell of a physical block (so-called SLC block) is SLC capable of recording two states, each physical word line stores user data of single pages. It requires one read voltage (RV) to determine which of the two states that the charges in each SLC can be classified into. When each memory cell of one SB (so-called MLC block) is MLC capable of recording four states, each physical word line stores user data of dual-pages including Most Significant Bit (MSB) pages and Least Significant Bit (LSB) pages. It requires three RVs to determine which of the four states that the charges in each MLC can be classified into. When each memory cell of one SB (so-called TLC block) is TLC capable of recording eight states, each physical word line stores user data of triple-pages, including MSB pages, Center Significant Bit (CSB) pages and LSB pages. It requires seven RVs to determine which of the eight states that the charges in each TLC can be classified into. When each memory cell of one SB (so-called QLC block) is QLC capable of recording sixteen states, each physical word line stores user data of quad-pages, including Top Significant Bit (TSB) pages, MSB pages, CSB pages and LSB pages. It requires fifteen RVs to determine which of the sixteen states that the charges in each QLC can be classified into.

For different types of physical pages, the manufacturer of the flash module 150 provides recommended RVs, so that the flash controller 130 can read data from the memory cells of the flash module 150. For example, the manufacturer of the flash module 150 may provide the recommended RVs {0.8V, 1.4V, 2.4V, 3.2V, 3.9V, 4.8V, 5.7V} to advise the flash controller 130 to read data of the MSB, CSB and LSB pages from the memory cells of a physical block that is configured as the TLC block.

When the idle time of the flash module 150 is too long or the service life of the flash module 150 is reduced to a specific level, the memory cells would experience voltage drift, resulting in poor stability of stored data and an increase in the error rate of reading data. If the voltage drift is too large, too many flipped bits of the read data would happen by using the default RVs to read the data in the memory cells, and in the worst case, the data loss may occur when the bit errors exceed the decoding and error correction capabilities of the error correction unit in the flash controller 130. The error correction unit of the flash controller 130 repeatedly uses the bit-flipping algorithm known by those skilled in the art to flip specific bits of read data with references made to supplementary information for the read data until the flipped data is correct or the total number of attempted times exceeds a limit. The error correction unit of the flash controller 130 may be the Low-Density Parity-Check (LDPC) decoder. In order to solve the serious voltage drift phenomenon of the memory cells, the flash controller 130 after detecting read errors with default RVs usually drives the flash I/F 139 to read data from the memory cells by using re-read voltages and then sends the read results to the error correction unit. The procedure may require trying multiple sets of re-read voltages before it is successful.

Figure 4:
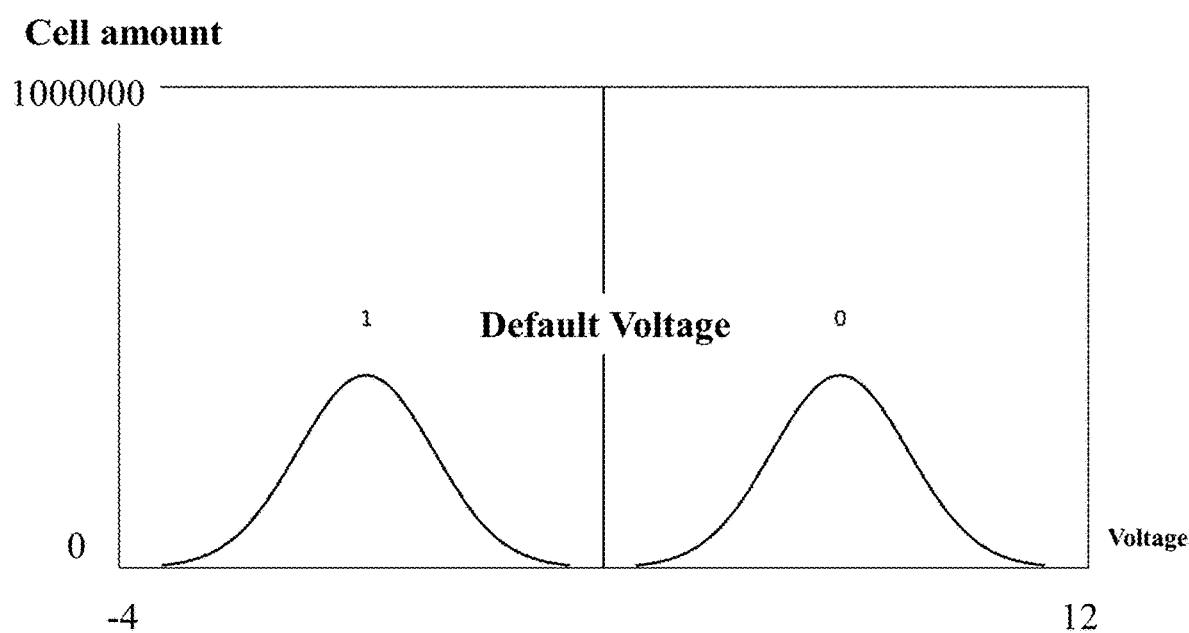
FIG. 4 shows the distribution graph for Single Level Cell (SLC) in regular situations according to an embodiment of the invention.
Figure 5:
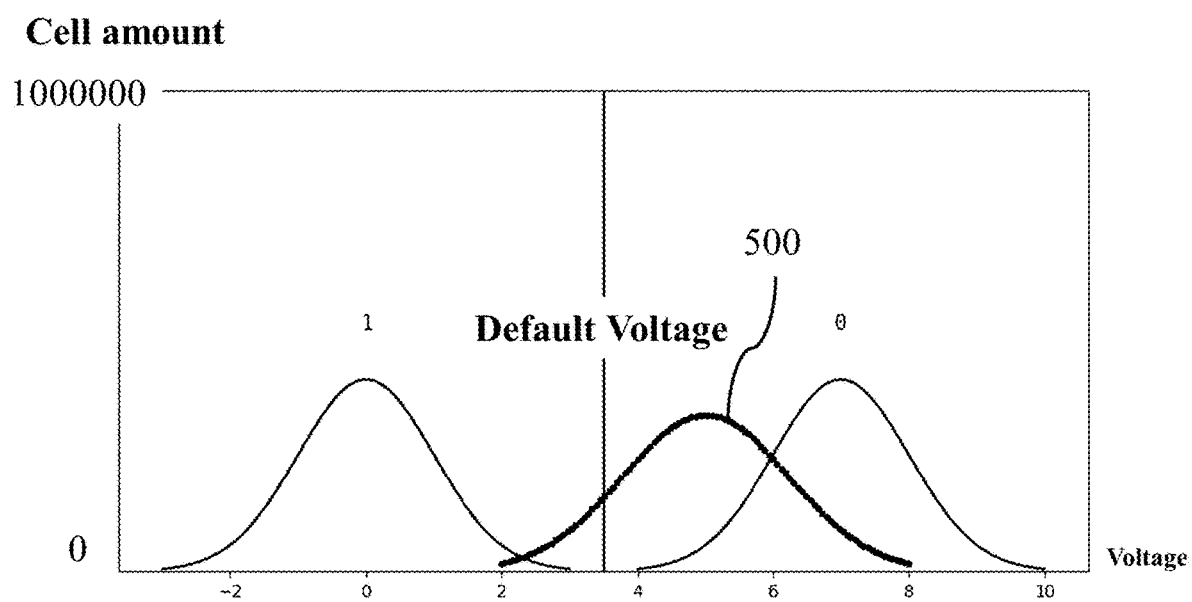
FIG. 5 shows the distribution graph for the SLC when voltage drift occurs according to an embodiment of the invention.

Electrons are injected by applying a programming voltage to a floating gate (or other structure), and the injected electrons are locked therein when a specific data bit is programmed into a memory cell. A judgment is made after applying an RV to a memory cell when a specific data bit is read from the memory cell. If the memory cell after being applied to an RV is turned on, then the reading result is 0. Otherwise, the reading result is 1. Taking SLC as an example, FIG. 4 shows the distribution graph for SLC in regular situations. When the flash module 150 is left unused for a long time, the SLCs in the flash module 150 may experience voltage drift. FIG. 5 shows the distribution graph for the SLC when voltage drift occurs, in which the thicker curve 500 is the cell distribution after voltage drift. At this time, if the default voltage is used to read data, many incorrect bits would be read, so that the error correction unit in the flash controller 130 performs many bit flips for the read data. When the amount of error bits is higher than the error correction capability of the LDPC decoder, the LDPC decoder would fail and the data would be lost.

Figure 6:
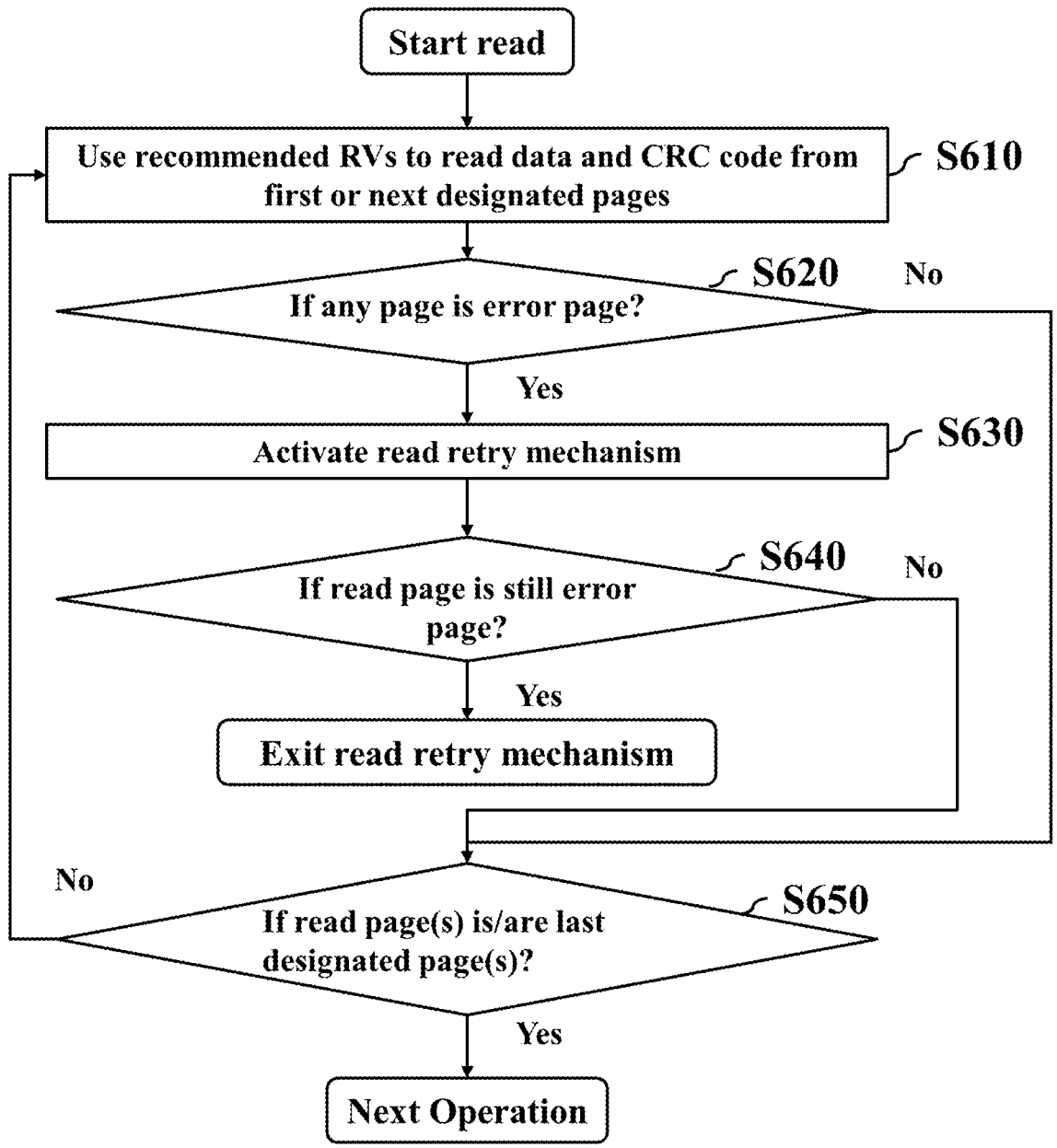
FIG. 6 is a flowchart illustrating a method for reading data according to an embodiment of the invention.

Refer to FIG. 6 showing a flowchart illustrating a method for reading data, performed by the processing unit 134 of the flash controller 130. The method drives the flash I/F 139 of the flash controller 130 to read data from one or more designated pages in the flash module 150 according to a host read command issued by the host side 110 or a background read command generated in a background operation. The background operation may include a garbage collection (GC) process, a wear leveling (WL) process, a read reclaim process, a read refresh process, or others. Details are provided as follows:

Step S610: The flash I/F 139 is driven to use the recommended RVs (also referred to as default RVs) provided by the manufacturer of the flash module 150 to read data and Cyclic Redundancy Check (CRC) code from the first or the next designated page(s) in the flash module 150. Since the read page can be an SLC page in the SLC block, an MSB or LSB page in the MLC block, an MSB, CSB or LSB page in the TLC block, or a TSB, MSB, CSB or LSB page in the QLC block, the control circuitry of the flash module 150 requires to use a specific set of the recommended RVs to read the designated pages. For example, the control circuitry of the flash module 150 uses the recommended RVs RV1 to RV7 associated with TLC to read the designated pages in the TLC block. Specifically, the flash module 150 uses the recommended RV1, and RV5 to read the LSB page in the TLC block, uses the recommended RV2, RV4, and RV6 to read the CSB page in the TLC block, and uses the recommended RV3, and RV7 to read the MSB page in the TLC block.

Step S620: It is determined whether any read page is an error page. If so, the process proceeds to step S630. Otherwise, the process proceeds to step S650. For example, the processing unit 134 may refer to the corresponding CRC code to determine whether the data of each read page is correct. If any page passes the check, it means that the page is a correct page. The processing unit 134 may drive the host I/F 131 to reply with the data of the designated page to the host side 110, or store the data of the designated page at the designated address of the RAM 136 instructed by a background read command. If any page cannot pass the check, the processing unit 134 activates an LDPC decoder (not shown in FIG. 1) to attempt to fix error bits in the read data. If the correction is successful, it means that the page is a correct page. The processing unit 134 may drive the host I/F 131 to reply with the corrected data of the designated page to the host side 110, or store the corrected data of the designated page at the designated address of the RAM 136 instructed by a background read command. If the correction by the LDPC decoder fails, it means that this page is still an error page.

Step S630: The read retry mechanism is activated. The read retry mechanism repeatedly executes a loop until the data of the read page is correct or all sets of re-read voltages have been tried. In some embodiments, in addition to the recommended RVs, the manufacturer of the flash module 150 provides a re-read voltage table recording multiple sets of re-read voltages. In alternative embodiments, a re-read voltage table provided by the manufacturer of the flash module 150 records multiple sets of offset values, so that the processing unit 134 can obtain corresponding re-read voltages according to the recommended RVs and the corresponding set of offset values. For example, an exemplary re-read voltage table for TLC is shown in Table 1:

TABLE 1

| Record No. | RV1  | RV2  | RV3  | RV4  | RV5  | RV6  | RV7  |
|------------|------|------|------|------|------|------|------|
| R#0        | 0    | 0    | 0    | 0    | 0    | 0    | 0    |
| R#1        | 0x02 | 0x02 | 0xFE | 0xFE | 0xF6 | 0xF4 | 0xF4 |
| R#2        | 0xF7 | 0xFE | 0xFC | 0xFA | 0xF2 | 0xF1 | 0xEA |
| R#3        | 0x00 | 0xFF | 0xFB | 0xF9 | 0xF5 | 0xF0 | 0xEE |
| R#4        | 0xFC | 0xF9 | 0xF9 | 0xFB | 0xF5 | 0xF5 | 0xF2 |
| R#5        | 0xFA | 0xFA | 0xF6 | 0xF8 | 0xF4 | 0xF1 | 0xF0 |

The re-read voltage table includes six records, and each record stores seven offset values corresponding to RV1 to RV7 for reading TLC. Each offset value is an integer represented by two's complement, "0x01" represents +1, "0x02" represents +2, and so on, "0xFF" represents −1, "0xFE" represents −2, and so on. The processing unit 134 may calculate the re-read voltage for TLC by the following equation (1):

$$RV_{adj,i} = RV_{rem,i} + R\ V_{off,i} \times Scale$$

$RV_{adj,i}$ represents the $i^{th}$ re-read voltage, $RV_{rem,i}$ represents the $i^{th}$ recommended RV provided by the manufacturer of the flash module 150, $RV_{off,i}$ represents the $i^{th}$ offset value in a specific record of the re-read voltage table, i is any integer ranging from 1 to 7, and Scale represents a preset adjustment scale. Assume that the recommended RVs are {0.8V, 1.4V, 2.4V, 3.2V, 3.9V, 4.8V, 5.7V} for reading TLC, Scale is set to 0.01, and the offset values {+2, +2, −2, −2, −10, −10, −12} are obtained from the first record of the re-read voltage table: The re-read voltages calculated by the processing unit 134 are {0.82V, 1.42V, 2.38V, 3.18V, 3.8V, 4.7V, 5.58V}.

Each iteration in the loop includes the following operations: reading data and CRC code from a designated page with one specific re-read RV or one specific set of re-read RVs; and determining whether the read data is correct with the corresponding CRC code. If it is correct, then the read retry mechanism ends. If it is incorrect and there is a re-read voltage or a set of re-read voltages that has not been tried yet, the read retry goes to the next iteration.

Step S640: It is determined whether the read page is still an error page. If so, the process ends and exits the read retry mechanism. Otherwise, the process proceeds to step S650. In other words, when all sets of re-read voltages have been tried and the correct data of this page cannot be obtained, the read page is still determined to be an error page.

In some embodiments, the processing unit 134 after exiting the read retry mechanism replies with information about a device error through the host I/F 131. In alternative embodiments, the processing unit 134 after exiting the read retry mechanism activates a soft-decoding re-read process for attempting to recover the data and the CRC code of this page according to data of other pages, and cross-page CRC code in the same group.

Step S650: It is determined whether the read page(s) is/are the last designated page(s). If so, the process ends and enters a state of the next operation. Otherwise, the process proceeds to step S610 for reading the next designated page(s).

Figure 7:
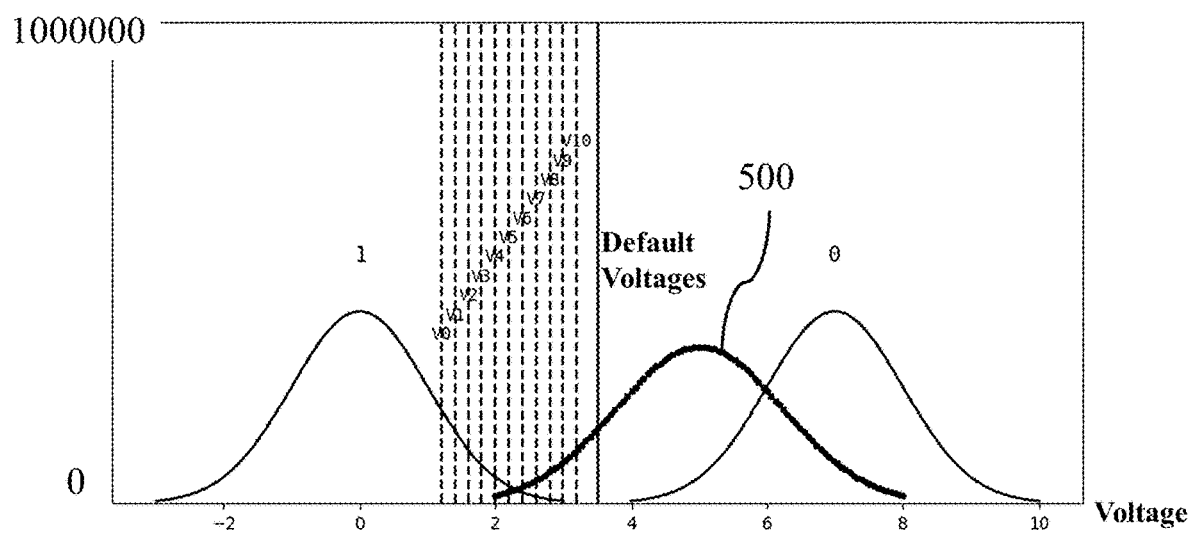
FIG. 7 shows an example of the read retry mechanism for the SLC block according to an embodiment of the invention.

FIG. 7 shows an example of the read retry mechanism for the SLC block. The flash controller 130 obtains the re-read voltages {V0, V1, V2, . . . , V10} for SLC from the re-read voltage table sequentially. The flash controller 130 first uses the re-read voltage V0 to read data. If the reading fails, the flash controller 130 uses the next re-read voltage V1, and so on. If all re-read voltages have been tried and the reading still fails, the read retry mechanism ends. In this example, the data read by flash controller 130 using the re-read voltage V5 or V6 is easily decoded successfully, which requires retrying five or six times.

Figure 8:
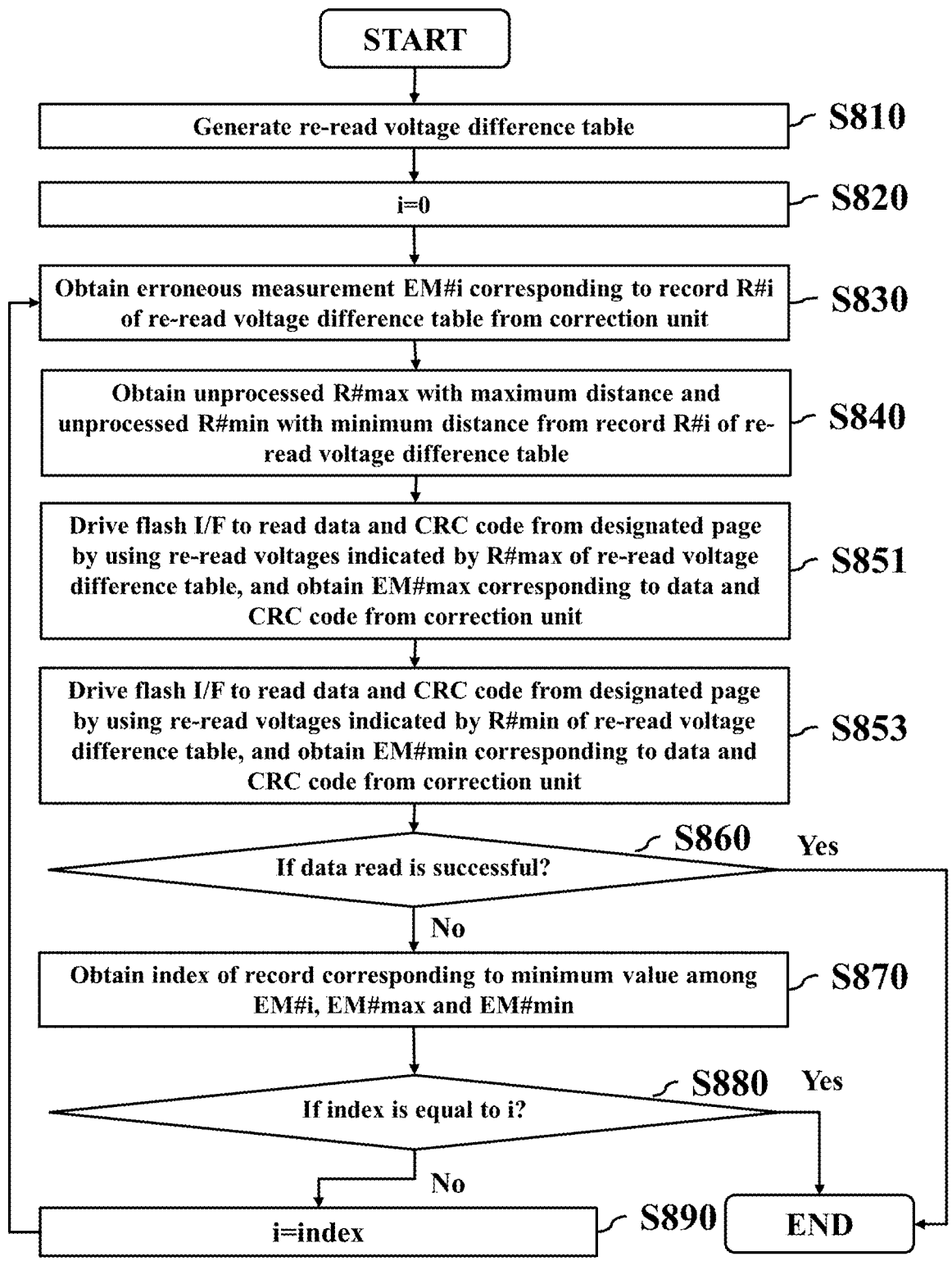
FIG. 8 is a flowchart illustrating a method for read retry according to an embodiment of the invention.

However, the serial retry as described above would be further optimized to improve the performance of read retry mechanism to reduce device-side delay and power consumption. Refer to FIG. 8 showing a flowchart illustrating a method for read retry, performed by the processing unit 134 of the flash controller 130. Details are provided as follows:

Step S810: A re-read voltage difference table is generated according to the re-read voltage table. The re-read voltage difference table includes multiple records. Each record of the re-read voltage difference table stores a set (also referred to as this set) of re-read voltages or offset values in a designated record (also referred to as this record) of the re-read voltage table, and multiple differences in re-read voltages or offset values. A total number of differences enclosed in one record of the re-read voltage difference table is equal to a total number of records in the re-read voltage table. Each difference indicates a distance between this set of re-read voltages or offset values and a set of re-read voltages or offset values that are stored in a specific record of the re-read voltage table. A set of re-read voltages may also be referred to as a group of re-read voltages. A set of offset values may also be referred to as a group of offset values. The processing unit 134 may calculate the difference between this set of re-read voltages or offset values in this record of the re-read voltage table and a set of re-read voltages or offset values that are stored in a specific record of the re-read voltage table by the following equation (2):

$$D = \sum_{k=1}^{n}(RV_{j,k} - RV_{x,k})^2$$

D represents the distance between this set of re-read voltages or offset values in this record of the re-read voltage table and the set of re-read voltages or offset values that are stored in the specific record of the re-read voltage table, n represents a total number of voltages required for a particular page type, j represents the index of this record of the re-read voltage table, x represents the index of the specific record of the re-read voltage table, $RV_{j,k}$ represents the $k^{th}$ re-read voltage or offset value in this record of the re-read voltage table, and $RV_{x,k}$ represents the $k^{th}$ re-read voltage or offset value in the set of re-read voltages or offset values that are stored in the specific record of the re-read voltage table. For example, an exemplary re-read voltage difference table corresponding to Table 1 showing the exemplary re-read voltage table for TLC is shown in Table 2:

TABLE 2

| Record No. | RV1 | RV5 | R#0 | R#1 | R#2 | R#3 | R#4 | R#5 |
|---|---|---|---|---|---|---|---|---|
| R#0 | 0 | 0 | 0 | 104 | 277 | 121 | 137 | 180 |
| R#1 | 0x02 | 0xF6 | 104 | 0 | 137 | 5 | 37 | 68 |
| R#2 | 0xF7 | 0xF2 | 277 | 137 | 0 | 90 | 34 | 13 |
| R#3 | 0x00 | 0xF5 | 121 | 5 | 90 | 0 | 16 | 37 |
| R#4 | 0xFC | 0xF5 | 137 | 37 | 34 | 16 | 0 | 5 |
| R#5 | 0xFA | 0xF4 | 180 | 68 | 13 | 37 | 5 | 0 |

For example, the record R #1 of the re-read voltage difference table stores the set (also referred to this set) of offset values {RV1=0x02, RV5=0xF6} in the record R #1 of the re-read voltage table, and multiple differences in offset values. The distances for sets of offset values in all records R #0 to R #5 of the re-read voltage table from this set of offset values are {104, 0, 137, 5, 37, 68}.

Step S820: The variable i is set to 0. The processing unit 134 uses the variable i to indicate the record number in the re-read voltage difference table.

Step S830: An erroneous measurement (EM) corresponding to the record R #i of the re-read voltage difference table is obtained from the error correction unit, which is used to indicate the error extent for reading data from a designated page of the flash module 150 with the corresponding re-read voltage set. For example, in the initial iteration, the processing unit 134 obtains the EM #0 corresponding to the record R #0 of the re-read voltage difference table from the error correction unit, which indicate the overall error extent for reading data from the designated page of the flash module 150 by using the recommended RVs.

Step S840: An unprocessed record R #max with the maximum distance and an unprocessed record R #min with the minimum distance are obtained from the record R #i of the re-read voltage difference table. It is noted that all records have been processed in previous iterations are removed from the re-read voltage difference table without consideration. For example, since the unprocessed records include records R #1 to R #5, the record R #1 of the re-read voltage difference table indicates the unprocessed record R #max=R #2 with the maximum distance from the offset value set of the record R #1, and the unprocessed record R #min=R #3 with the minimum distance from the offset value set of the record R #1.

Step S851: The flash I/F 139 is driven to read data and CRC code from the designated page by using the re-read voltage indicated by the record R #max of the re-read voltage difference table, the data and the CRC code are fed into the error correction unit, and the erroneous measurement EM #max corresponding to the data and the CRC code is obtained from the error correction unit.

Step S853: The flash I/F 139 is driven to read data and CRC code from the designated page by using the re-read voltage indicated by the record R #min of the re-read voltage difference table, the data and the CRC code are fed into the error correction unit, and the erroneous measurement EM #min corresponding to the data and the CRC code is obtained from the error correction unit.

Step S860: It is determined whether the data read is successful. If so, the read retry mechanism ends. Otherwise, the process proceeds to step S870. The processing unit 134 determines that the data read is successful when detecting that the read-out data with the re-read voltages indicated by the record R #max or R #min of the re-read voltage difference table is correct. Otherwise, the processing unit 134 determines that the data read fails. Regarding the technical details of whether the data read using the re-read voltages indicated by the record R #max or R #min of the re-read voltage difference table is correct, those skilled in the art can modify the operations of step S610 to complete that. Detailed operations are omitted herein for brevity.

Step S870: The index of the record corresponding to the minimum value among erroneous measurements EM #i, EM #max, and EM #min is obtained.

Step S880: It is determined whether the obtained index is equal to the variable i. If so, the read retry mechanism ends. Otherwise, the process proceeds to step S890. It implies that better re-read voltages cannot be found through the read retry mechanism when the obtained index is equal to the variable i. The determination allows the read retry mechanism to be terminated early without trying all sets of re-read voltages, which would reduce the delay in the device-side replying with the execution result for a host read command.

Step S890: The variable i is set to the obtained index. In other words, the processing unit 134 starts from the re-read voltages with a better read result to search for better possibilities.

In some embodiments, the correction unit described in steps S830, S851, and S853 can be a LDPC decoder, and the erroneous measurement can be a syndrome weight. The syndrome weight is any value greater than or equal to 0, which represents the overall error extent of the data read from a designated page of the flash module 150. A closer the value of the syndrome weight to 0 indicates a lower error extent. The larger the value of the syndrome weight indicates a higher error extent.

For ease of understanding, examples are given below to illustrate the methods described in FIGS. 6 and 8: Since the read-out page with the recommended RVs RV1 to RV5 is an error page (the "Yes" path of step S620), the processing unit 134 activates the read retry mechanism (step S630).

In the initial (first) iteration, the re-read voltage difference table for the LSB page of the TLC block is shown as Table 2 (step S810). The processing unit 134 obtains the syndrome weight SW #0 corresponding to the record R #0 of the re-read voltage difference table from the LDPC decoder (step S830). Subsequently, the record R #2 with the maximum distance, and the record R #1 with the minimum distance among the unprocessed records {R #1, R #2, R #3, R #4, R #5} are obtained from the record R #0 of Table 2 (step S840), the syndrome weight SW #2 corresponding to the record R #2 is obtained (step S851), and the syndrome weight SW #1 corresponding to the record R #1 is obtained (step S853). Suppose that the page read in this iteration fails and the minimum value among the syndrome weights SW #0, SW #1 and SW #2 is SW #1, and the second iteration is entered.

In the second iteration, the processing unit 134 searches for the record R #5 with the maximum distance, and the record R #3 with the minimum distance among the unprocessed records {R #3, R #4, R #5} from the record R #1 of Table 2 (step S840), obtains the syndrome weight SW #5 corresponding to the record R #5 (step S851), and obtains the syndrome weight SW #3 corresponding to the record R #3 (step S853). If the page read in this iteration fails and the minimum value among the syndrome weights SW #1, SW #3 and SW #5 is SW #1, then the processing unit 134 terminates the read retry mechanism.

Although the invention is illustrated and described herein with reference to specific embodiments, the invention is not intended to be limited to the details shown. Rather, various modifications may be made in the details within the scope and range of equivalents of the claims and without departing from the invention. It is to be understood that the above description is illustrative of the invention and is not to be construed as limiting the invention. Various modifications, applications and/or combinations of the embodiments may occur to those skilled in the art without departing from the scope of the invention as defined by the claims.

One having ordinary skill in the art will readily understand that the invention as discussed above may be practiced with hardware elements in configurations which are different than those which are disclosed. Therefore, although the invention has been described based upon these preferred embodiments, it would be apparent to those skilled in the art that certain modifications, variations, and alternative constructions would be apparent, while remaining within the scope of the invention.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent." etc.)

The term "device" or "module" is not limited to one or a specific number of physical objects (such as one smartphone, one controller, one processing system and so on). As used herein, a device may be any electronic device with one or more parts that may implement at least some portions of the invention in this disclosure. While the description and examples use the term "device" or "module" to describe various aspects of this disclosure, the term "device" or "module" is not limited to a specific configuration, type, or number of objects. Additionally, the term "system" or "module" is not limited to multiple components or specific aspects. For example, a system may be implemented on one or more printed circuit boards or other substrates and may have movable or static components. While the description and examples use the term "system" to describe various aspects of the invention in this disclosure, the term "system" is not limited to a specific configuration, type, or number of objects.

Specific details are provided in the description above to provide a thorough understanding of the aspects and examples provided herein. However, it will be understood by one of ordinary skills in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

Some or all of the aforementioned embodiments of the method of the invention may be implemented in a computer program such as a driver for a dedicated hardware, a Firmware Translation Layer (FTL) of a storage device, or others. Other types of programs may also be suitable, as previously explained. Since the implementation of the various embodiments of the present invention into a computer program can be achieved by the skilled person using his routine skills, such an implementation will not be discussed for reasons of brevity. The computer program implementing some or more embodiments of the method of the present invention may be stored on a suitable computer-readable data carrier, or may be located in a network server accessible via a network such as the Internet, or any other suitable carrier.

A computer-readable storage medium includes volatile and non-volatile, removable and non-removable media implemented in any method or technology for storage of information such as computer-readable instruction, data structures, program modules, or other data. A computer-readable storage medium includes, but is not limited to, RAM, ROM, EEPROM, flash memory or other memory, CD-ROM, digital versatile disks (DVD), Blue-ray disk or other optical storage, magnetic cassettes, magnetic tape, magnetic disk or other magnetic storage devices, or any other medium which can be used to store the desired information and may be accessed by an instruction execution system. Note that a computer-readable medium can be paper or other suitable medium upon which the program is printed, as the program can be electronically captured via, for instance, optical scanning of the paper or other suitable medium, then compiled, interpreted, or otherwise processed in a suitable manner, if necessary, and then stored in a computer memory.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Although the embodiment has been described as having specific elements in FIGS. 1-3, it should be noted that additional elements may be included to achieve better performance without departing from the spirit of the invention. Each element of FIGS. 1-3 is composed of various circuitries and arranged to operably perform the aforementioned operations. While the process flows described in FIGS. 6 and 8 include a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for read retry, performed by a processing unit of a flash controller, wherein the flash controller is coupled to a flash module through a flash interface (I/F) thereof, the method comprising:

providing a first set of re-read voltages in an iteration of a read retry mechanism, wherein the first set of re-read voltages are used in a previous iteration of a read retry mechanism or before the read retry mechanism is entered, and the processing unit has driven the flash I/F to use the first set of re-read voltages to read a designated page and obtain first data from the flash module;

obtaining a second set of re-read voltages with a maximum distance from the first set of re-read voltages, wherein the second set of re-read voltages are obtained from unprocessed sets of re-read voltages in a re-read voltage difference table;

driving the flash I/F to use the second set of re-read voltages to read the designated page and obtain second data from the flash module; and in response that the second data is correct, or the second data is successfully corrected by an error correction unit, exiting the read retry mechanism and replying with the second data or corrected second data to a host side or storing the second data or the corrected second data at a designated address of a random access memory (RAM).

2. The method of claim 1, comprising:

obtaining a third set of re-read voltages with a minimum distance from the first set of read-read voltages, wherein the third set of re-read voltages are obtained from the unprocessed sets of re-read voltages in the re-read voltage difference table;

driving the flash I/F to use the third set of re-read voltages to read the designated page and obtain third data from the flash module; and in response that the third data is correct, or the third data is successfully corrected by the error correction unit, exiting the read retry mechanism and replying with the third data or corrected third data to the host side or storing the third data or the corrected third data at the designated address of the RAM.

3. The method of claim 2, comprising:

obtaining a first erroneous measurement from the error correction unit, wherein the first erroneous measurement indicates an error extent of the first data that is detected by the error correction unit;

feeding the second data into the error correction unit when determining that the second data is error;

obtaining a second erroneous measurement from the error correction unit when the error correction unit cannot successfully correct the second data, wherein the second erroneous measurement indicates an error extent of the second data;

feeding the third data into the error correction unit when determining that the third data is error;

obtaining a third erroneous measurement from the error correction unit when the error correction unit cannot successfully correct the third data, wherein the third erroneous measurement indicates an error extent of the third data; and exiting the read retry mechanism when a minimum value among the first erroneous measurement, the second erroneous measurement, and the third erroneous measurement is the first erroneous measurement.

4. The method of claim 3, wherein the error correction unit is a Low-Density Parity-Check (LDPC) decoder, and is arranged operably to: repeatedly use a bit-flipping algorithm to flip specific bits in the second data with references made to supplementary information for the second data until flipped second data is correct or a total number of attempted times exceeds a limit; and repeatedly use the bit-flipping algorithm to flip specific bits in the third data with references made to supplementary information for the third data until flipped third data is correct or a total number of attempted times exceeds the limit.

5. The method of claim 4, wherein the first erroneous measurement, the second erroneous measurement, and the third erroneous measurement are syndrome weights, each syndrome weight is any value greater than or equal to 0, a closer a value of each syndrome weight to 0 indicates a lower error extent, and a larger the value of each syndrome weight indicates a higher error extent.

6. The method of claim 1, wherein the re-read voltage difference table comprises a plurality of records, each record comprises a first set of offset values in a re-read voltage table, distances of second sets of offset values from the first set of offset values, the second sets of offset values are stored in the re-read voltage table, and the processing unit is arranged operably to: calculate a fourth set of re-read voltages according to a set of recommended read voltages and the first set of offset values; and calculate a fifth set of re-read voltages according to the set of recommended read voltages and each second set of offset values.

7. The method of claim 6, wherein the distance of each second set of offset values from the first set of offset values in the re-read voltage difference table is calculated by the following equation:

$$D = \sum_{k=1}^{n}(RV_{j,k} - RV_{x,k})^2$$

D represents the distance between the first set of offset values and a specific second set of offset values, n represents a total number of voltages required for a particular page type, j represents an index of the first set of offset values in the re-read voltage table, x represents an index of the specific second set of offset values, $RV_{j,k}$ represents a $k^{th}$ offset value in the first set of offset values, and $RV_{x,k}$ represents a $k^{th}$ offset value in the specific second set of offset values.

8. A non-transitory computer-readable storage medium having stored therein program code that, when loaded and executed by a processing unit of a flash controller, which is coupled to a flash module through a flash interface (I/F), causes the processing unit of the flash controller to:
provide a first set of re-read voltages in an iteration of a read retry mechanism, wherein the first set of re-read voltages are used in a previous iteration of a read retry mechanism or before the read retry mechanism is entered, and the processing unit has driven the flash I/F to use the first set of re-read voltages to read a designated page and obtain first data from the flash module;
obtain a second set of re-read voltages with a maximum distance from the first set of re-read voltages, wherein the second set of re-read voltages are obtained from unprocessed sets of re-read voltages of a re-read voltage difference table;
drive the flash I/F to use the second set of re-read voltages to read the designated page and obtain second data from the flash module; and
in response that the second data is correct, or the second data is successfully corrected by an error correction unit, exit the read retry mechanism and reply with the second data or corrected second data to a host side or store the second data or the corrected second data at a designated address of a random access memory (RAM).

9. The non-transitory computer-readable storage medium of claim 8, wherein the program code that, when loaded and executed by the processing unit of the flash controller, causes the processing unit of the flash controller to:
obtain a third set of re-read voltages with a minimum distance from the first set of read-read voltages, wherein the third set of re-read voltages are obtained from the unprocessed sets of re-read voltages in the re-read voltage difference table;
drive the flash I/F to use the third set of re-read voltages to read the designated page and obtain third data from the flash module; and
in response that the third data is correct, or the third data is successfully corrected by the error correction unit, exit the read retry mechanism and reply with the third data or corrected third data to the host side or store the third data or the corrected third data at the designated address of the RAM.

10. The non-transitory computer-readable storage medium of claim 9, wherein the program code that, when loaded and executed by the processing unit of the flash controller, causes the processing unit of the flash controller to:
obtain a first erroneous measurement from the error correction unit, wherein the first erroneous measurement indicates an error extent of the first data that is detected by the error correction unit;
feed the second data into the error correction unit when determining that the second data is error;
obtain a second erroneous measurement from the error correction unit when the error correction unit cannot successfully correct the second data, wherein the second erroneous measurement indicates an error extent of the second data;
feed the third data into the error correction unit when determining that the third data is error;
obtain a third erroneous measurement from the error correction unit when the error correction unit cannot successfully correct the third data, wherein the third erroneous measurement indicates an error extent of the third data; and
exit the read retry mechanism when a minimum value among the first erroneous measurement, the second erroneous measurement, and the third erroneous measurement is the first erroneous measurement.

11. The non-transitory computer-readable storage medium of claim 10,
wherein the error correction unit is a Low-Density Parity-Check (LDPC) decoder, and is arranged operably to: repeatedly use a bit-flipping algorithm to flip specific bits in the second data with references made to supplementary information for the second data until flipped second data is correct or a total number of attempted times exceeds a limit; and repeatedly use the bit-flipping algorithm to flip specific bits in the third data with references made to supplementary information for the third data until flipped third data is correct or a total number of attempted times exceeds the limit,
wherein the first erroneous measurement, the second erroneous measurement, and the third erroneous measurement are syndrome weights, each syndrome weight is any value greater than or equal to 0, a closer a value of each syndrome weight to 0 indicates a lower error extent, and a larger the value of each syndrome weight indicates a higher error extent.

12. The non-transitory computer-readable storage medium of claim 8, wherein the re-read voltage difference table comprises a plurality of records, each record comprises a first set of offset values in a re-read voltage table, distances of second sets of offset values from the first set of offset values, the second sets of offset values are stored in the re-read voltage table, and the processing unit is arranged operably to: calculate a fourth set of re-read voltages according to a set of recommended read voltages and the first set of offset values; and calculate a fifth set of re-read voltages according to the set of recommended read voltages and each second set of offset values.

13. The non-transitory computer-readable storage medium of claim 12, wherein the distance of each second set of offset values from the first set of offset values in the re-read voltage difference table is calculated by the following equation:

$$D = \sum_{k=1}^{n}(RV_{j,k} - RV_{x,k})^2$$

D represents the distance between the first set of offset values and a specific second set of offset values, n represents a total number of voltages required for a particular page type, j represents an index of the first set of offset values in the re-read voltage table, x represents an index of the specific second set of offset values, $RV_{j,k}$ represents a $k^{th}$ offset value in the first set of offset values, and $RV_{x,k}$ represents a $k^{th}$ offset value in the specific second set of offset values.

14. An apparatus for read retry, comprising:
a flash interface (I/F), coupled to a flash module; and
a processing unit, coupled to the flash I/F, arranged operably to: provide a first set of re-read voltages in an iteration of a read retry mechanism, wherein the first set of re-read voltages are used in a previous iteration of a read retry mechanism or before the read retry mechanism is entered, and the processing unit has driven the flash I/F to use the first set of re-read voltages to read a designated page and obtain first data from the flash module; obtain a second set of re-read voltages with a maximum distance from the first set of re-read voltages, wherein the second set of re-read voltages are obtained from unprocessed sets of re-read voltages of a re-read voltage difference table; drive the flash I/F to use the second set of re-read voltages to read the designated page and obtain second data from the flash module; and in response that the second data is correct, or the second data is successfully corrected by an error correction unit, exit the read retry mechanism and reply with the second data or corrected second data to a host side or store the second data or the corrected second data at a designated address of a random access memory (RAM).

15. The apparatus of claim 14, wherein the processing unit is arranged operably to: obtain a third set of re-read voltages with a minimum distance from the first set of read-read voltages, wherein the third set of re-read voltages are obtained from the unprocessed sets of re-read voltages in the re-read voltage difference table; drive the flash I/F to use the third set of re-read voltages to read the designated page and obtain third data from the flash module; and in response that the third data is correct, or the third data is successfully corrected by the error correction unit, exit the read retry mechanism and reply with the third data or corrected third data to the host side or store the third data or the corrected third data at the designated address of the RAM.

16. The apparatus of claim 15, wherein the processing unit is arranged operably to: obtain a first erroneous measurement from the error correction unit, wherein the first erroneous measurement indicates an error extent of the first data that is detected by the error correction unit; feed the second data into the error correction unit when determining that the second data is error; obtain a second erroneous measurement from the error correction unit when the error correction unit cannot successfully correct the second data, wherein the second erroneous measurement indicates an error extent of the second data; feed the third data into the error correction unit when determining that the third data is error; obtain a third erroneous measurement from the error correction unit when the error correction unit cannot successfully correct the third data, wherein the third erroneous measurement indicates an error extent of the third data; and exit the read retry mechanism when a minimum value among the first erroneous measurement, the second erroneous measurement, and the third erroneous measurement is the first erroneous measurement.

17. The apparatus of claim 16, wherein the error correction unit is a Low-Density Parity-Check (LDPC) decoder, and is arranged operably to: repeatedly use a bit-flipping algorithm to flip specific bits in the second data with references made to supplementary information for the second data until flipped second data is correct or a total number of attempted times exceeds a limit; and repeatedly use the bit-flipping algorithm to flip specific bits in the third data with references made to supplementary information for the third data until flipped third data is correct or a total number of attempted times exceeds the limit.

18. The apparatus of claim 17, wherein the first erroneous measurement, the second erroneous measurement, and the third erroneous measurement are syndrome weights, each syndrome weight is any value greater than or equal to 0, a closer a value of each syndrome weight to 0 indicates a lower error extent, and a larger the value of each syndrome weight indicates a higher error extent.

19. The apparatus of claim 14, wherein the re-read voltage difference table comprises a plurality of records, each record comprises a first set of offset values in a re-read voltage table, distances of second sets of offset values from the first set of offset values, the second sets of offset values are stored in the re-read voltage table, and the processing unit is arranged operably to: calculate a fourth set of re-read voltages according to a set of recommended read voltages and the first set of offset values; and calculate a fifth set of re-read voltages according to the set of recommended read voltages and each second set of offset values.

20. The apparatus of claim 19, wherein the distance of each second set of offset values from the first set of offset values in the re-read voltage difference table is calculated by the following equation:

$$D = \sum_{k=1}^{n}(RV_{j,k} - RV_{x,k})^2$$

D represents the distance between the first set of offset values and a specific second set of offset values, n represents a total number of voltages required for a particular page type, j represents an index of the first set of offset values in the re-read voltage table, x represents an index of the specific second set of offset values, $RV_{j,k}$ represents a $k^{th}$ offset value in the first set of offset values, and $RV_{x,k}$ represents a $k^{th}$ offset value in the specific second set of offset values.

* * * * *